(No Model.) 2 Sheets—Sheet 1.
W. J. CHANINEL.
SAFETY VEHICLE.
No. 526,664. Patented Sept. 25, 1894.
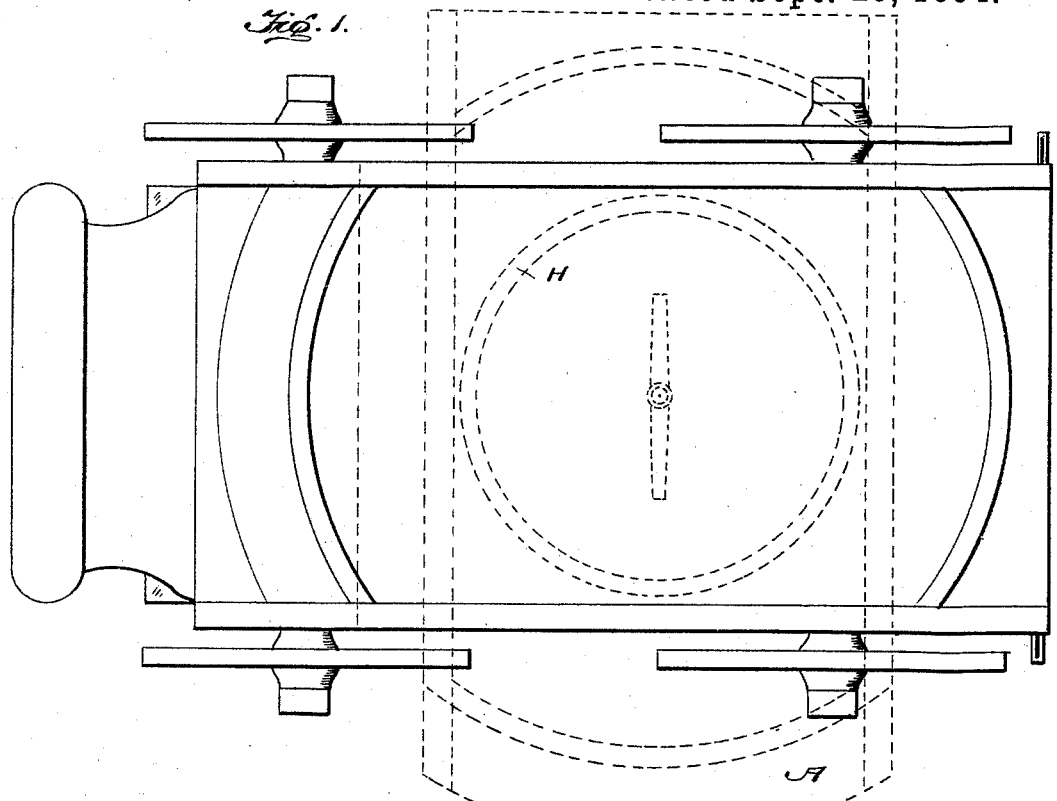
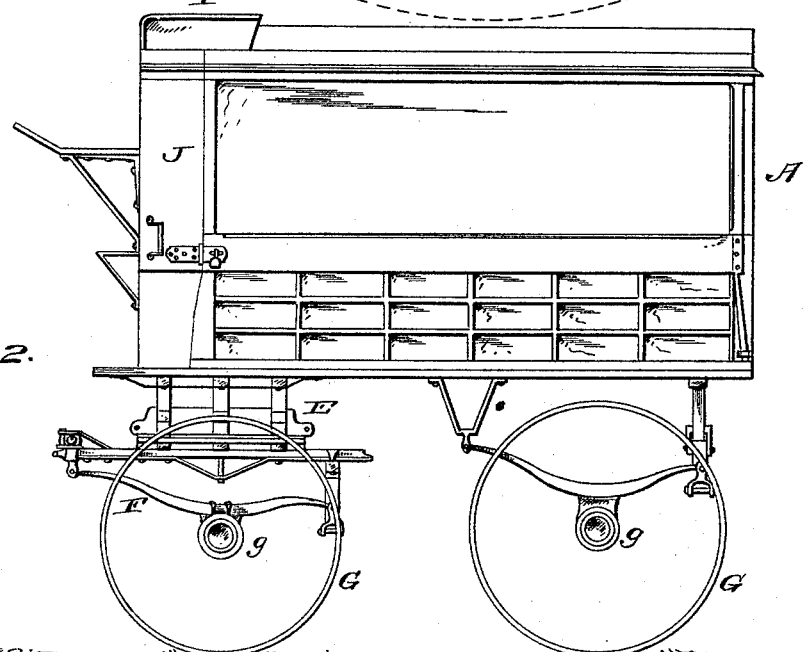
Witnesses:
Inventor:
William J. Chaninel.
By Edson Bros. Att'ys

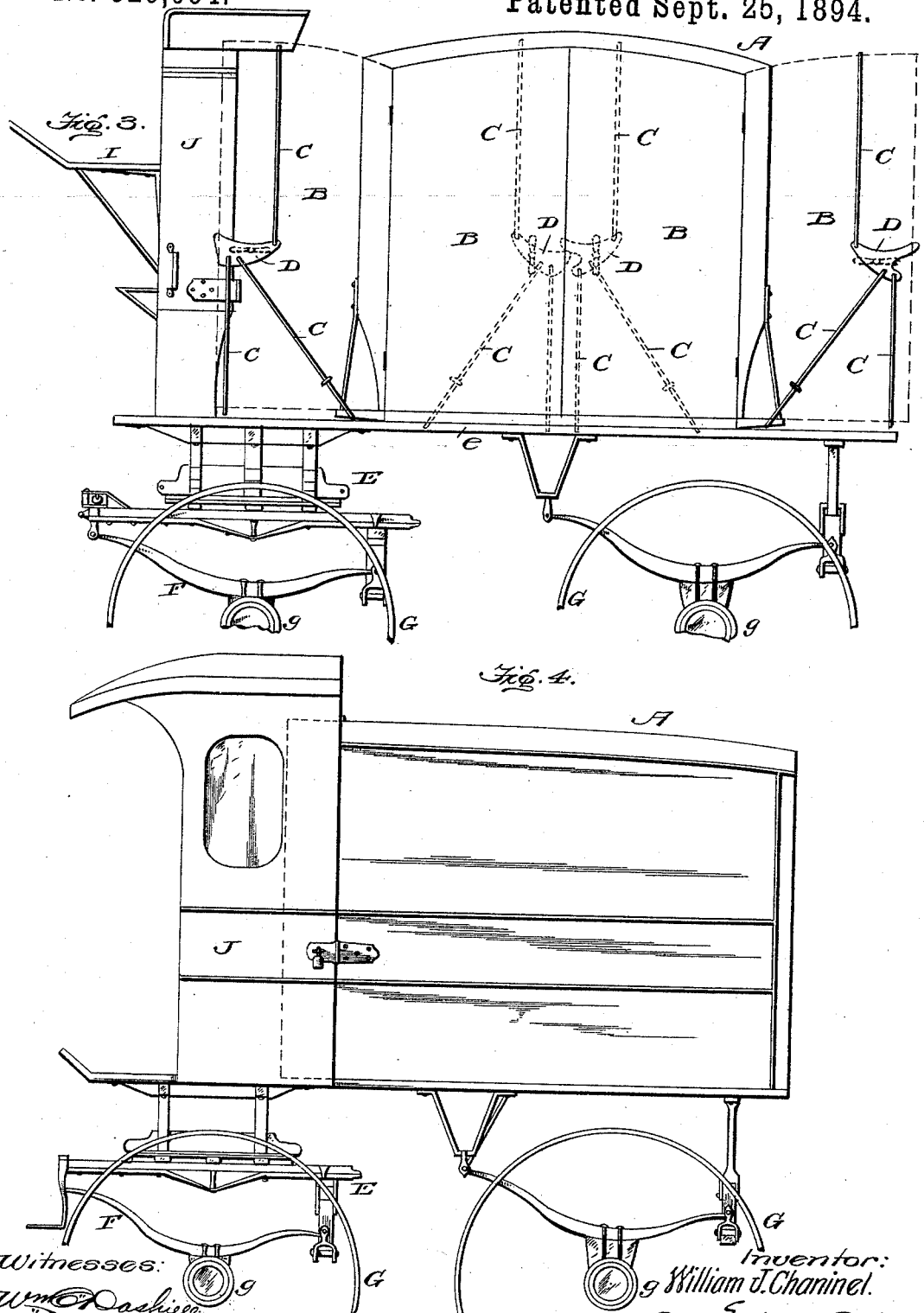

UNITED STATES PATENT OFFICE.

WILLIAM JULIAN CHANINEL, OF PHILADELPHIA, PENNSYLVANIA, ASSIGNOR TO THE LENGERT COMPANY, OF SAME PLACE.

SAFETY-VEHICLE.

SPECIFICATION forming part of Letters Patent No. 526,664, dated September 25, 1894.

Application filed January 2, 1894. Serial No. 495,400. (No model.)

*To all whom it may concern:*

Be it known that I, WILLIAM JULIAN CHANINEL, a citizen of the United States, residing at Philadelphia, in the county of Philadelphia and State of Pennsylvania, have invented certain new and useful Improvements in Safety-Vehicles; and I do hereby declare the following to be a full, clear, and exact description of the invention, such as will enable others skilled in the art to which it appertains to make and use the same.

My invention relates to a novel vehicle designed for the safe transportation of valuables, such as money, jewels, and merchandise in general which it is desired to transport under guard of one or more persons.

With these and other ends in view, the invention consists, generally, of a closed body having means for securely closing and locking one end thereof, combined with a wheeled truck or running gear, and means for connecting the body and truck and which permit said closed body to have a horizontal turning movement on the truck, whereby said body may be adjusted at a right angle, or any desired angle, across the length of the truck, to facilitate the removal of its contents and also enables the front end of the body, having the doors, to be arranged at the front end of the truck, immediately in rear of the seat to be occupied by the driver and guard.

The details of the invention may be varied, but I prefer to connect the body to the truck by means of a turn-table, and to construct the body in a very substantial manner, as by lining the same with metal, and with closed sides, top, bottom and rear end, but the front end of the body is provided with doors which permit of access to the interior of the body when the latter is turned out of line with the seat or upright front panel on the front end of the truck. These doors may be locked by bolts which securely fasten them in their closed positions, and said bolts also prevent the body from turning when the front end of the body, with the doors, is in rear of the seat-support or upright front panel at the front end of the truck; but said locking bolts may be dispensed with and the body fastened to the front panel by an ordinary hasp-lock.

The invention further consists in the novel combination of devices and peculiar construction and arrangement of parts which will be hereinafter more fully described and particularly pointed out in the claims.

To enable others to more readily understand my invention, I have illustrated the preferred embodiment thereof in the accompanying drawings, forming a part of this specification, and in which—

Figure 1 is a top plan view showing the body, by full lines, adjusted lengthwise on the truck, and by dotted lines, turned at right angles to the truck. Fig. 2 is a side elevation with the body locked to the upright front panel, preferably by means of an ordinary hasp-lock. Fig. 3 is a front elevation showing another embodiment of the locking mechanism, the dotted lines representing the doors and locking mechanism, and the full lines showing the doors thrown open and with the locking mechanism thereon. Fig. 4 is a modification of my vehicle.

Like letters of reference denote corresponding parts in all the figures of the drawings, referring to which—

A designates the revoluble or turning body of my safety vehicle. This body is preferably of the general rectangular form shown, although the form or shape of the body can be varied as may be found most convenient and desirable; and this body is constructed in a substantial manner, with closed sides, top, bottom, and rear end. The front end of this body, however, is left open, and it is provided with doors, B, B, which are connected to the body in any desirable way, as for instance, by hinges. The doors are designed, when closed, to be locked to the body of the vehicle, and as one means for locking the doors and preventing the body from turning on the truck when adjusted in line with the bed and the upright front panel, I have devised the endwise-movable bolts, C, C, shown by Fig. 3. These bolts, C, C, are suitably guided on the doors and connected to throw-pieces, D, which are pivoted to the doors and provided with handles for their convenient manipulation. The bolts and throw-pieces are so proportioned that a quarter turn of the throw-pieces will serve to withdraw the bolts sufficiently from their keepers or sockets on the bed of the truck, and thus release the body so as to permit it to be turned around on the truck; and a further movement of the throw-pieces will wholly withdraw the bolts and permit the doors to be opened, to enable access to be had to the interior of the body, A. I do not, however, strictly limit myself to the use of these bolts and throw-pieces for locking the doors at the open end of the body and for holding the body on the truck, and I may dispense with said bolts and throw-pieces, in which event I fasten the body, when closed, to the upright front panel, J, by an ordinary hasp and pad lock, as in Fig. 2, whereby the panel, J, prevents access to the doors and front end of the body, A, when the latter is locked.

E is the truck having the bed, e. F is the running gear, and G are the wheels which are mounted on the axles, g, and these wheels are of such diameter that they lie wholly below the horizontal level of the bed, e, as shown, to permit the body to have the desired movement on the bed without interference or hindrance from the wheels.

The body, A, rests fairly upon the horizontal bed, e, and it is connected thereto by means of the turn-table, H, arranged centrally on the bed and body. Said turn-table may be of any preferred construction, but in the drawings, I have shown simply two concentric upper and lower sections fastened, respectively, to the body and to the truck-bed, and said sections are connected together by a vertical king-bolt. However, the sections may ride on roller bearings, or any other suitable bearing may be used between the sections of the turn-table and they may be connected in any preferable way.

At the front end of the truck, I provide the seat, I, for the driver, or the driver and guard. This seat is fixed upon the support or panel, J, erected at the front end of the truck-bed, and said panel preferably lies transversely across the bed, see Fig. 1, the rear side of the panel being curved so as to be concentric with the curved end of the turning body, A, which enables the panel to lie snugly against said front end of the body and yet permit the latter to have free movement on the turn-table.

In Fig. 4 of the drawings, I have shown a modified construction of my safety vehicle in which the front panel is constructed so as to inclose the open front end of the body A, and with projecting sides and an overhanging hood for sheltering the driver, or driver and guard, from the weather. In this form of my safety vehicle, I dispense with the doors at the front end of the body, A, and construct the front upright panel so as to inclose the open front end of the body, the latter being fastened to the panel by any suitable means, as for instance, by a hasp and padlock.

It is obvious that by locking the body so that its open front end is adjacent to the panel and seat, the driver, or the driver and guard, are enabled to more effectually prevent any attempt to rob the vehicle of its contents. The vehicle can be drawn up alongside of a door or pavement, the body unlocked, and then swung around to the desired position across the truck, so that the contents of the vehicle can be conveniently removed.

I am aware that changes in the form and proportion of parts, and in the details of construction, of the mechanism herein shown and described as an embodiment of my invention can be made without departing from the spirit or sacrificing the advantages thereof, and I therefore reserve the right to make such alterations as fairly fall within the scope of the invention.

Having thus fully described my invention, what I claim as new, and desire to secure by Letters Patent, is—

1. A safety vehicle for transporting valuables consisting of a wheeled truck, a closed body mounted to turn on the truck and having a closed rear end and a door at its front end, and means for locking the door and the closed body on the truck, for the purposes described substantially as set forth.

2. A safety transport vehicle consisting of a truck having its wheels below the bed thereof, a seat support or panel erected on the front end of the truck, and a turning body mounted on the bed and arranged to be closed against said upright panel or seat-support, for the purposes described, substantially as set forth.

3. A safety transport vehicle, consisting of a wheeled truck, an upright panel or seat support at the forward end of the truck, a body, and a turn-table which connects the body and truck, for the purposes described, substantially as set forth.

4. A safety transport vehicle comprising a wheeled truck, an upright panel erected on the front end of the truck-bed, a closed body mounted on a turn-table which is arranged between said body and the truck-bed, and locking devices for preventing the body from turning on the truck-bed when the front end of the body is adjusted in rear of the panel, substantially as and for the purposes described.

In testimony whereof I affix my signature in presence of two witnesses.

WILLIAM JULIAN CHANINEL.

Witnesses:
FRANCIS E. BUCHER,
SAMUEL F. CLEVENGER.